(12) United States Patent
Wengrovitz

(10) Patent No.: US 7,002,912 B2
(45) Date of Patent: Feb. 21, 2006

(54) ARCHITECTURE FOR TRANSPORTING PBX SIGNALING CODES VIA SIP

(75) Inventor: Michael Wengrovitz, Concord, MA (US)

(73) Assignee: Alcatel, Paris (FR)

( * ) Notice: Subject to any disclaimer, the term of this patent is extended or adjusted under 35 U.S.C. 154(b) by 510 days.

(21) Appl. No.: 10/074,340

(22) Filed: Feb. 12, 2002

(65) Prior Publication Data

US 2003/0043992 A1    Mar. 6, 2003

Related U.S. Application Data

(60) Provisional application No. 60/317,673, filed on Sep. 6, 2001, provisional application No. 60/317,744, filed on Sep. 6, 2001.

(51) Int. Cl.
    *H04J 1/16*    (2006.01)
    *H04J 3/16*    (2006.01)
    *H04L 12/28*   (2006.01)
    *H04L 12/56*   (2006.01)

(52) U.S. Cl. ............... 370/230; 370/236; 370/467; 370/401; 709/228; 709/229

(58) Field of Classification Search ........... 370/230, 370/352–357, 401, 522, 465–467, 496, 236; 709/227–229
See application file for complete search history.

(56) References Cited

U.S. PATENT DOCUMENTS 6,434,143 B1   8/2002   Donovan
6,453,034 B1   9/2002   Donovan et al.
6,621,793 B1 * 9/2003   Widegren et al. ........ 370/230.1
6,795,430 B1 * 9/2004   Ong et al. .................. 370/352
2002/0131575 A1 * 9/2002   Gallant .................. 379/220.01

OTHER PUBLICATIONS

Alcatel OmniPCX 4400, Specifications; Jan. 15, 2001; 12 pp.
Alcatel OmniPCX 4400, Jan. 15, 2001; 20 pp.
Alcatel 4980 PC Telephony/Alcatel 4980 IP Telephony; Quick User Guide; 2 pp.
Donovan, S.; *The SIP INFO Method*; Network Working Group; Request for Comments: 2976; Oct. 2000; pp. 1-8.

(Continued)

*Primary Examiner*—Chi Pham
*Assistant Examiner*—Ronald Abelson
(74) *Attorney, Agent, or Firm*—Craig A. Hoersten; V. Lawrence Sewell

(57) ABSTRACT

An integrated PBX and SIP telephony communications network supporting transmission of private signaling codes over SIP. A telephone emits a private signaling code for accessing a particular PBX function. An enhanced IP translator coupled to the telephone encapsulates the private signaling code within a SIP invite, request, response, information, notification message, and/or instant message. The SIP message with the encapsulated private signaling codes is transmitted over a communications network to a PBX. The PBX is also coupled to an enhanced IP translator that receives the SIP message and decapsulates the embedded private signaling codes. The codes are transmitted to the PBX for rendering a function for the telephone. A SIP user agent aware of the private signaling codes may also access functions provided by the PBX by encapsulating/decapsulating private signaling codes into/from SIP messages.

14 Claims, 13 Drawing Sheets

OTHER PUBLICATIONS

Handley, M. et al.; *SDP: Session Description Protocol*; Network Working Group; Request of Comments: 2327; Apr. 1998; pp. 1-37.

Handley, M et al.; *SIP: Session Initiation Protocol*; Network Working Group; Request of Comments: 2543: Mar. 1999: pp. 1-132.

Internet papers: Alcatel pushes VoIP into branch office with new IP features for OmiPCX 4400; Feb. 6, 2001; 2 pp.

Rosernberg et al.; *SIP Extension for Presence*; Internet Engineering Task Force; Internet Draft; Mar. 30, 2001; pp. 1-39.

International Search Report dated Dec. 20, 2002, for corresponding PCT Patent Application No. PCT/US02/28191, filed Sep. 4, 2002.

\* cited by examiner

```
INVITE sip:14084955072@sc1.alcatelnetworks.com SIP/2.0
Via: SIP/2.0/UDP sc10.alcatelnetworks.com
From: sip:14085655675@sc10.alcatelnetworks.com
To: sip:14084955072@sc1.alcatelnetworks.com
Call-ID: 12319990217120955009990sc12.alcatelnetworks.com
CSeq: 1234 INVITE
Contact: <sip:14085655675@sc10.alcatelnetworks.com>
Content-Length: 358
Content-Type: multipart/mixed; boundary=unique-boundary-1
MIME-Version: 1.0

--unique-boundary-1
Content-Type: application/SDP; charset=ISO-10646 v=0
o=audet 2890844526 2890842807 5 IN IP4 134.177.64.4
s=SDP seminar
c=IN IP4 MG141.alcatelnetworks.com
t= 2873397496 2873404696
m=audio 9092 RTP/AVP 0 3 4

--unique-boundary-1
Content-type:application/AlcatelPBX_opcodes; version=4.1.1

00 47 01 03 a3 05 00 29 06 07 00 04 17 00 27 80
00 31 3a 34 30 30 39 20 20 20 20 20 20 20 20 20
--unique-boundary-1--
```

FIG. 6A

```
INVITE sip:14084955072@sc1.alcatelnetworks.com SIP/2.0
Via: SIP/2.0/UDP sc10.alcatelnetworks.com
From: sip:14085655675@sc10.alcatelnetworks.com
To: sip:14084955072@sc1.alcatelnetworks.com
Call-ID: 1231999021712095500999@sc12.alcatelnetworks.com
CSeq: 1234 INVITE
Contact: <sip:14085655675@sc10.alcatelnetworks.com>
Content-Length: 389
Content-Type: multipart/mixed; boundary=unique-boundary-1
MIME-Version: 1.0

--unique-boundary-1
Content-Type: application/SDP; charset=ISO-10646 v=0
o=audet 2890844526 2890842807 5 IN IP4 134.177.64.4
s=SDP seminar
c=IN IP4 MG141.alcatelnetworks.com
t= 2873397496 2873404696
m=audio 9092 RTP/AVP 0 3 4

--unique-boundary-1
Content-type:application/AlcatelPBX_mnemonic_set1.6.1; version=4.1.1 icon1=steady_flash;voicemode=ringing;tune=7;cadence=standard;volume=0
display_line1=4009 is calling;
--unique-boundary-1--
```

FIG. 6B

ARCHITECTURE FOR TRANSPORTING PBX SIGNALING CODES VIA SIP

CROSS-REFERENCE TO RELATED APPLICATION(S)

This application claims the benefit of U.S. provisional application Nos. 60/317,673 and 60/317,744, both filed on Sep. 6, 2001, the contents of both of which are incorporated herein by reference. This application also contains subject matter that is related to the subject matter disclosed in U.S. application Ser. No. 09/966,155, filed on Sep. 28, 2001, the content of which is also incorporated herein by reference.

FIELD OF THE INVENTION

This invention relates generally to internet telephony, and more particularly, to transporting private telephony signaling codes using an application layer control protocol.

BACKGROUND OF THE INVENTION

In a conventional private branch exchange (PBX) network, the intelligence of the system generally resides within the PBX, while the phone is a simple terminal. The PBX allows the phone to make and receive simple telephone calls, and also provides numerous additional services such as, for example, dial-by-name, voice mail, speed dial, call transfer, display of caller information, and the like. Such PBX functionality is generally achieved by the exchange of digital, vendor-specific, private signaling codes between the phone and the PBX.

The underlying transport mechanism for the private signaling code exchange may be a direct point-to-point digital connection, or via an internet protocol (IP) based networked connection. In an IP based networked connection, the telephone is generally an IP telephone or a digital telephone with an IP translator, either of which is capable of IP telephony communication.

FIG. 1 is a schematic block diagram of a typical IP telephony network. The network includes a telephone 10 coupled to a PBX 12 over an IP network 14. The telephone 10 preferably communicates with the PBX 12, and accesses the full host of services provided by the PBX by transmitting private signaling codes over the IP network 14. For example, when a button on the telephone 10 is pressed, the corresponding private signaling code is transmitted from the telephone to the PBX 12 to request the PBX to perform an operation for the phone, such as, for example, a call hold operation. The telephone 10 and the PBX 12 are preferably coupled to one or more IP translators 16, 20 translating between private code/voice signaling and IP signaling. The IP translator 16 coupled to the telephone 10 receives private signaling codes transmitted by the phone, encapsulates the codes within IP packets, and transmits these IP packets over the IP network 14. The private signaling code packets are typically transport layer TCP or UDP packets. Digital voice transmitted by the telephone 10 is converted into packetized voice, such as, for example, real time protocol (RTP) packets, which are also then transmitted over the IP network 14 via the IP translator 16.

A recipient translator 20 receives the IP packets, decapsulates the private signaling codes, and forwards these codes to the PBX 12 for invoking a particular PBX function for the telephone 10. The RTP voice packets are also decompressed, converted to standard digital voice, and sent to the PBX.

Some PBX systems similarly accomplish the overall function of converting between packetized and digital data using IP translators which are internal to the PBX and telephone devices, instead of the external translators 16, 20 as shown in FIG. 1.

A major deficiency with the network illustrated in FIG. 1 is that the private signaling codes transmitted in traditional IP packets by the IP translators 16, 20 are generally vendor-specific and unidentifiable by other third-party devices. Powerful third-party SIP services such as intelligent call redirection, one-number forwarding, integration with presence and instant messaging functions, and other such services are incompatible with the private signaling code IP packets.

Another deficiency with existing networks is that other IP phones that adhere to standardized application-layer control protocols, such as H.323 and session initiation protocol (SIP), do not utilize private signaling codes for communicating with a specific PBX. Further, although H.323/SIP phones can communicate with some PBXs, the PBX services provided are generally simple, such as, for example, making or receiving a call. The H.323 and SIP phones are generally not exposed to the full suite of PBX services accessible only via private signaling codes.

Accordingly, it is desirable to have a telephone system that may take advantage of the full integrated suite of services provided by both the PBX system and the SIP network. Such an integrated system allows the PBX system to take advantage of existing and emerging third-party SIP services. It also allows SIP hardware-based IP phones and software-based user agents, to take full advantage of the PBX services.

SUMMARY OF THE INVENTION

The present invention is directed to a system and method for transporting private signaling codes via an application layer control protocol such as, for example, a SIP protocol. According to one embodiment, the invention is directed to a telephony communications network that includes a telephony unit, a translator coupled to the telephony unit, and a communications interface coupled to the translator. The telephony unit generates telephony signaling codes. The translator encapsulates the telephony signaling codes in an application layer control protocol message. The communications interface transmits the message with the telephony signaling codes over a communications network.

In another embodiment, the invention is directed to a telephony communications network that includes a telephony unit and a translator coupled to the telephony unit where the translator includes a signaling interface, a processor coupled to the signaling interface, and a network interface coupled to the processor. The signaling interface receives telephony signaling codes. The processor encapsulates the telephony signaling code in an application layer control protocol message. The communications interface transmits the message with the telephony signaling code over a communications network.

In a further embodiment, the invention is directed to a method for communication over a telephony network. The method includes generating telephony signaling codes, encapsulating the telephony signaling codes in an application layer control protocol message, and transmitting the message with the telephony signaling code over a communications network.

It should be appreciated, therefore, that the present invention allows conventional digital telephone sets and SIP user agents to enjoy both the full set of PBX functionality provided by existing SIP servers and SIP services provided by existing SIP servers.

BRIEF DESCRIPTION OF THE DRAWINGS

These and other features, aspects and advantages of the present invention will be more fully understood when considered with respect to the following detailed description, appended claims, and accompanying drawings where:

FIGS. 6A–6B are schematic layout diagrams of exemplary SIP messages with embedded private signaling codes according to one embodiment of the invention;

DETAILED DESCRIPTION

Figure 2:
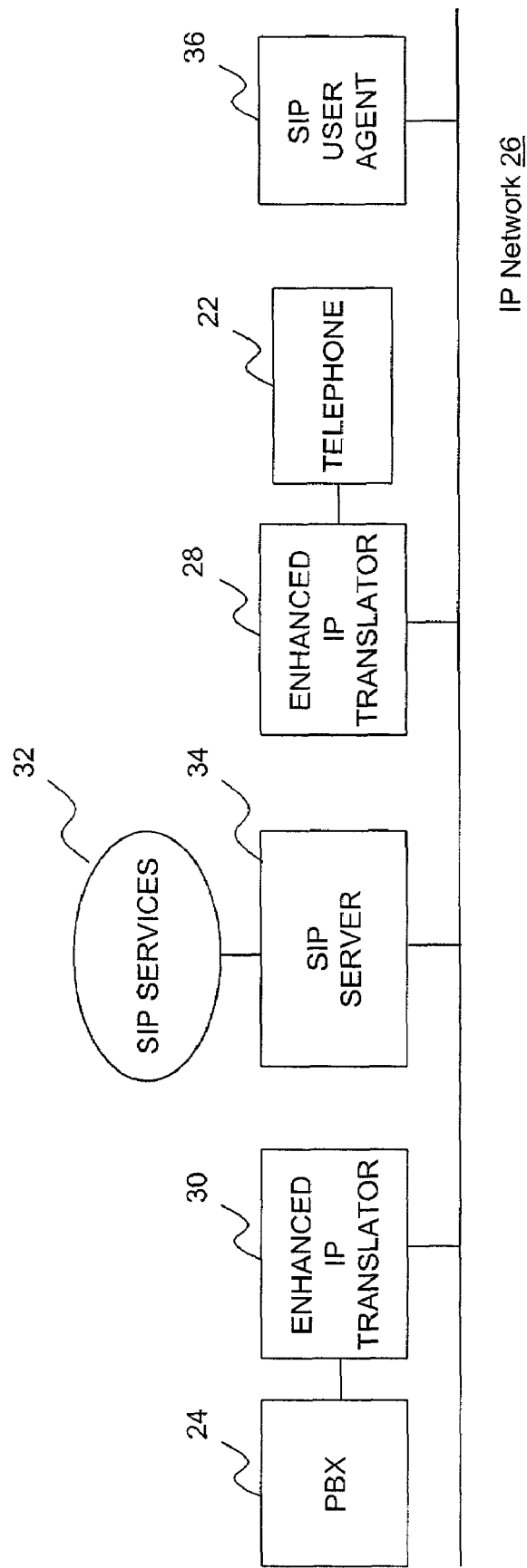
FIG. 2 is a block diagram of an integrated PBX and SIP telephony communications network supporting transmission of private signaling codes over SIP according to one embodiment of the invention.

FIG. 2 is a block diagram of an integrated PBX and SIP telephony communications network according to one embodiment of the invention. The network preferably includes a telephone 22 communicating with a PBX 24 over a communications network, such as, for example, an IP network 26. The PBX 24 is further coupled to a server, such as, for example, a SIP server 34, for routing telephone calls to and from the telephone 22 and/or a SIP user agent 36. The SIP server 34 further makes available to the telephone 22 various SIP services 32 such as, for example, call forking, caller preferences, encryption, authentication, firewall control, billing, call routing, and the like.

The telephone 22 and PBX 24 are each preferably coupled to one or more enhanced IP translators 28, 30 translating between private signaling codes/commands typically sent at a TCP/IP Layer 3 transport level and Layer 4 application messages created according to a standardized session protocol transmitted between the PBX 24 and telephone 22. The private signaling codes/commands may take the form of vendor-specific PBX codes conventional in the art.

The Layer 4 application messages may take the form of SIP messages created according to the SIP protocol set forth in Internet Engineering Task Force Request for Comment 2543 entitled "SIP: Session Initiation Protocol," March 1999 (hereinafter referred to as RFC 2543), the content of which is incorporated herein by reference. A person skilled in the art should recognize, however, that any other TCP/IP application layer (Layer 4) control protocol known in the art may be used instead of SIP, such as, for example, H.323, MGCP, or the like. The described embodiments are therefore not limited to the use of SIP messages.

Figure 1:
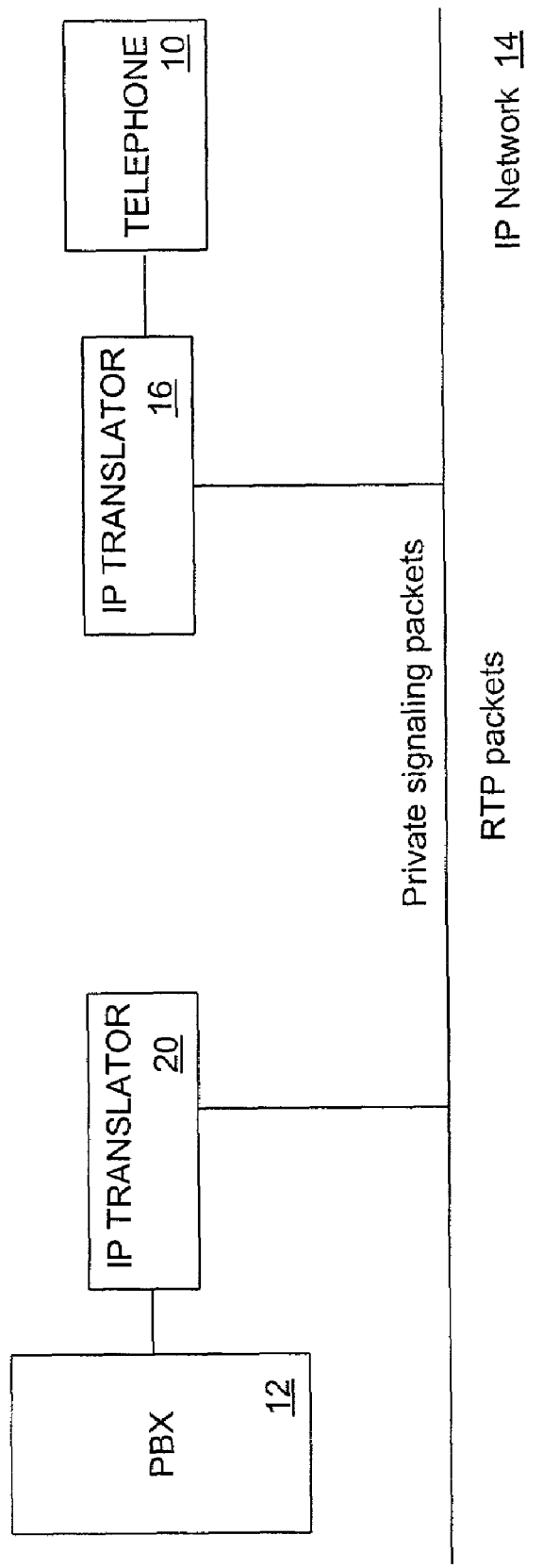
FIG. 1 is a schematic block diagram of a typical IP telephony network conventional in the art.

The enhanced IP translators 28, 30 may be similar to the IP translators 16, 20 illustrated in FIG. 1, but are preferably enhanced with the capability of encapsulating/decapsulating private signaling codes in SIP messages. The enhanced IP translators 28, 30 may be hardware or software devices external to the telephone 22 and/or PBX 24, or may be incorporated internally as part of the telephone and/or PBX. For example, enhanced IP translator 28 may be a plug-in device that may be removably attached to a conventional digital telephone.

The telephone 22 may be similar to the telephone 10 illustrated in FIG. 1. For example, the telephone 22 may be an Alcatel Advanced Reflexes™ 4035 terminal available from Alcatel Corporation. The telephone 22 may also be any other digital telephone conventional in the art capable of communicating with a PBX via private signaling codes.

The PBX 24 may be similar to the PBX 12 illustrated in FIG. 1. For example, the PBX 24 may be an OmniPCX 4400 available from Alcatel Corporation. The PBX 24 may also be any other PBX conventional in the art that provides a full host of PBX services for the telephone 22 in response to private signaling codes received from the telephone. Such services include, but are not limited to dial-by-name, voice mail, speed dial, call hold, call transfer, call conference, multi-line access, call-detail records, and the like.

The SIP server 34 may be a proxy or redirect server as described in RFC 2543, or an application server or back-to-back-user-agent for providing third-party services. The SIP user agent 36 is preferably a PC, telephone, or any other device that includes a SIP stack. For example, the SIP user agent 36 may be a PC-based Windows XP Messenger application provided by Microsoft Corporation. The SIP user agent 36 may either be aware or unaware of the private signaling codes exchanged between the PBX 24 and telephone 22. If the SIP user agent 36 is unaware of the private signaling codes, the user agent may transmit and receive simple calls through the PBX 24, but may derive no additional PBX services available via exchange of private signaling codes. If the SIP user agent 36 is made aware of the private signaling codes, it may make use of the full set functions provided by the PBX 24, by suitably reading and writing private signaling data within SIP message bodies, as similarly done by the enhanced IP translators 28, 30.

In general terms, private signaling codes transmitted from the PBX 24 or telephone 22 are encapsulated by the enhanced IP translators 28, 30 in SIP messages and transmitted over the IP network 26 either directly or via the SIP server 34. Voice is transported via conventional RTP packets.

The SIP messages used to transport private signaling codes include, but are not limited to, INVITE, NOTIFY, INFO, OK, BYE, and other types of SIP messages conventional in the art which are described in further detail in RFC 2543 as well as in Internet Engineering Task Force Request for Comment 2976 entitled "The SIP INFO Method," October 2000, and in Internet Engineering Task Force Internet Draft entitled "SIP Extensions for Presence," September 2001, the contents of which are incorporated herein by reference.

The encapsulation of private signaling codes within SIP messages allow the telephone 22 access to the full host of functionalities provided by the PBX 24, while also taking advantage of the various SIP services 32 provided via the SIP server 34.

Figure 3:
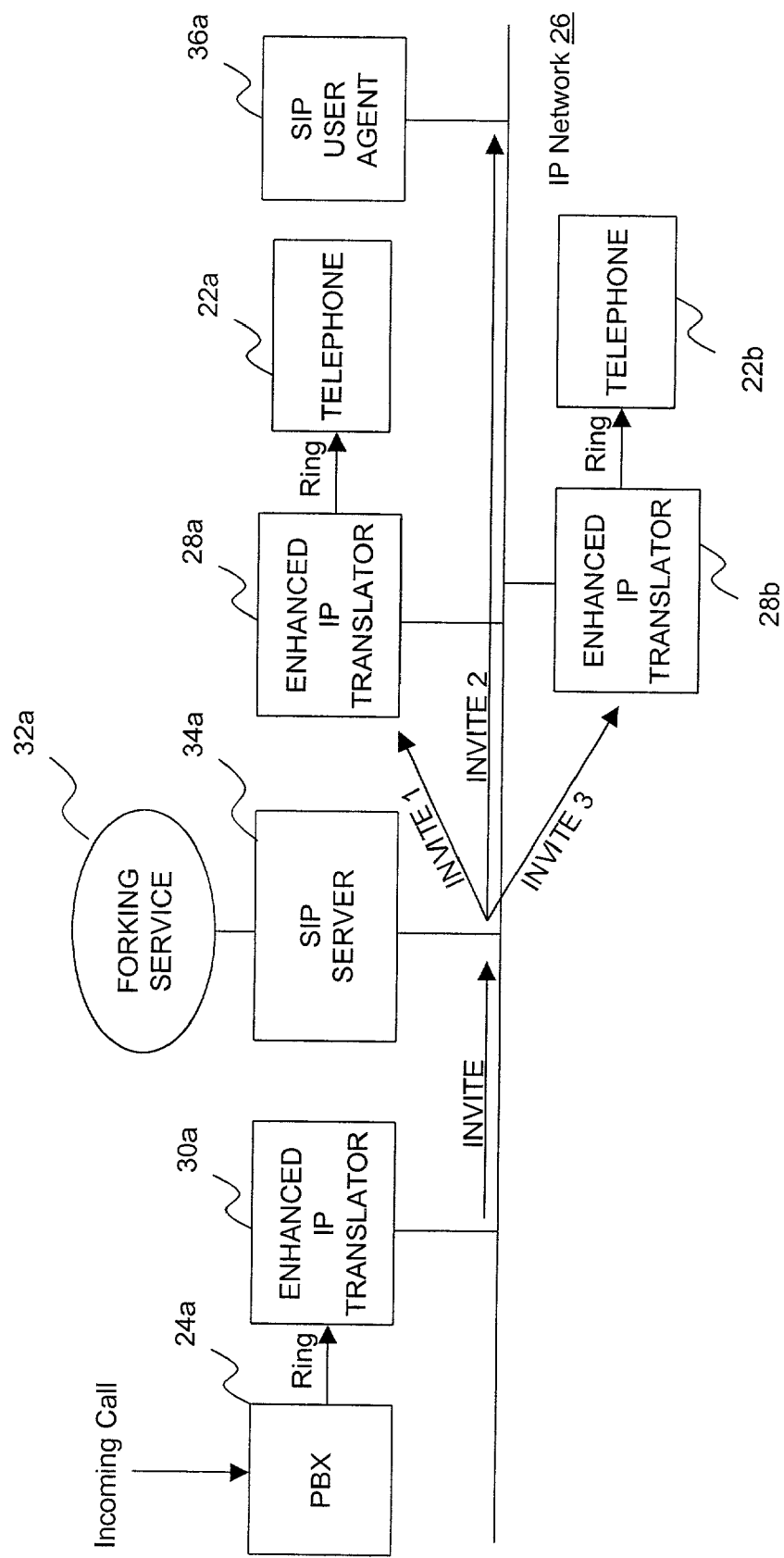
FIG. 3 is a block diagram of an integrated network similar to the network of FIG. 2 providing an exemplary SIP forking service.

FIG. 3 is a block diagram of the telephony communications network similar to the network of FIG. 2 where one exemplary SIP service is call forking 32a. The telephony communications network of FIG. 3 preferably includes a PBX 24a coupled to an enhanced IP translator 30a, a SIP server 34a, telephones 22a, 22b each coupled to enhanced IP translators 28a, 28b, and a SIP user agent 36a. According to one example, the PBX 24a receives an incoming call from a PSTN trunk connection or from another PBX extension. The PBX 24a initiates a vendor-specific private ring command to the destination telephone extension, such as, for example, extension "1234." The enhanced IP translator 30a encapsulates the vendor-specific private ring command within a SIP INVITE message and transmits the message to the SIP server 34a.

According to one embodiment of the invention, the SIP server 34a invokes the forking service 32a for contacting one or more devices which have registered for the called extension "1234." The callee may have registered telephone 22a (an office phone), telephone 22b (a laboratory phone), and SIP user agent 36a (a PC) as all being associated with extension "1234".

The SIP server 34a transmits a SIP INVITE message with the ring command body to the devices registered for the called extension based on the mechanism indicated by the forking service 32a. The forking service 32a may indicate, for example, that the INVITE message is to be transmitted concurrently to all registered devices. In this instance, the ring command in the transmitted INVITE messages causes all registered devices to ring concurrently until one of the devices answers the call.

The forking service 32a may alternatively indicate that the INVITE message is to be transmitted to the registered devices in a particular order. For example, the INVITE message may be first sent to telephone 22a and upon no answer, to telephone 22b. If telephone 22b also fails to answer the call, the INVITE message may be transmitted to the SIP user agent 36a. Upon no answer by SIP user agent 36a, the forking service may indicate that the call is to be forwarded to a voice mail system, which might be either internal to the PBX or resident on the SIP network as another SIP service.

The forking service may further indicate particular hours at which an incoming call is to be transmitted to a particular device. For example, telephone 22a may receive incoming INVITE messages between 8 am–6 pm, telephone 22b between 6 pm–10 pm, and SIP user agent 36a between 10 pm–8 am.

Upon receipt of an INVITE message by the enhanced IP translators 28a, 28b, the embedded private ring command is extracted and transmitted to the appropriate telephone 22a, 22b, causing the telephone to ring. The embedded private ring command transmitted to the SIP user agent 36a is either ignored or interpreted by the agent depending on whether the agent is aware or unaware of the private signaling codes. In either case, receipt of the SIP INVITE message triggers an incoming call indication on the device associated with the SIP user agent 36a, and thereby alerts the callee.

Figure 4:
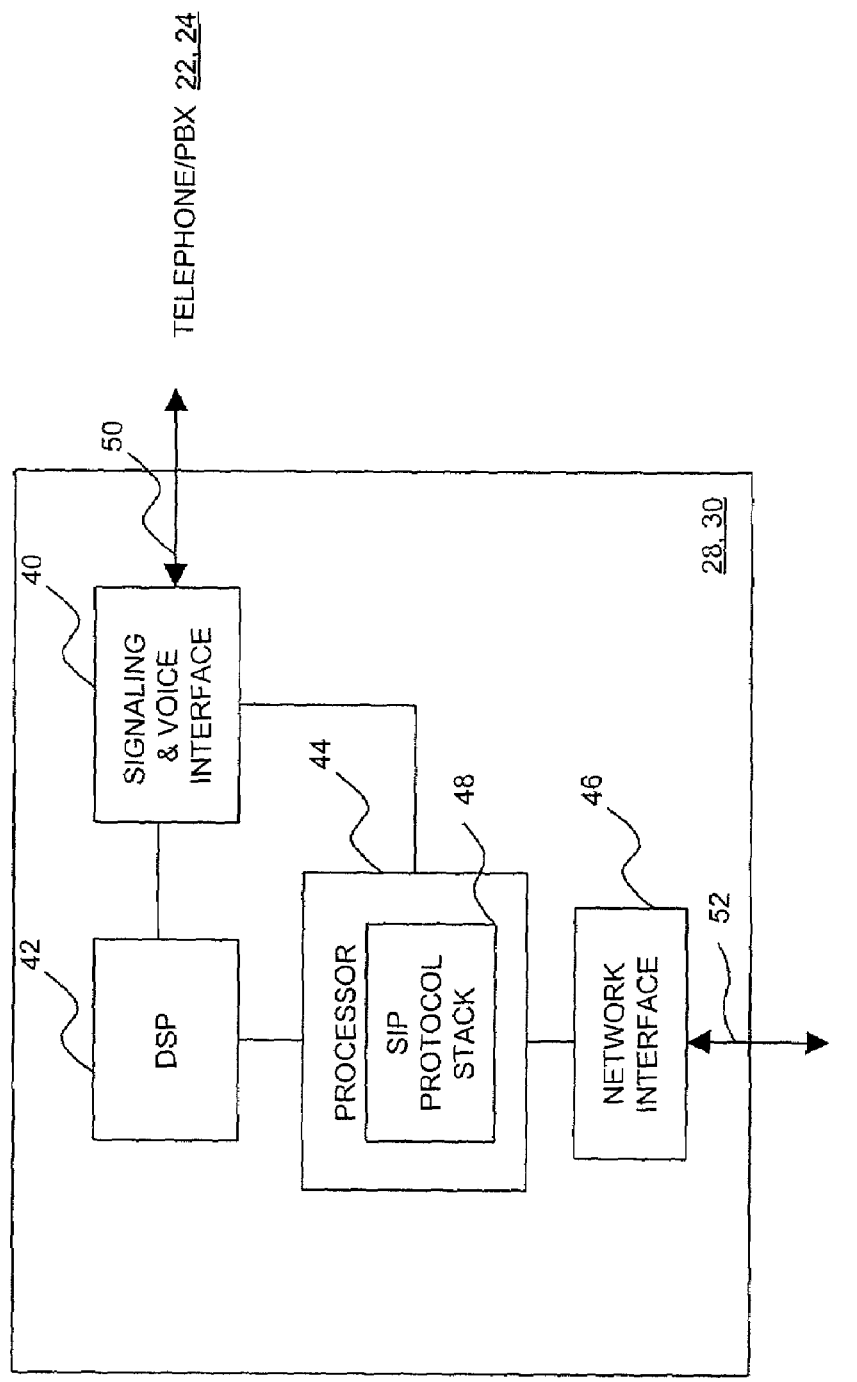
FIG. 4 is a schematic block diagram of an enhanced IP translator which encodes/decodes private signaling codes in SIP messages according to one embodiment of the invention.

FIG. 4 is a schematic block diagram of the enhanced IP translator 28, 30 according to one embodiment of the invention. The enhanced IP translator preferably includes a private digital signaling and voice interface 40, digital signal processor (DSP) 42, central processor 44, and network interface 46. The central processor 44 preferably includes a SIP stack 48, for encapsulating/un-encapsulating private signaling codes in SIP messages.

In one embodiment, the signaling and voice interface 40 receives private signaling codes and voice signals from the telephone 22 or PBX 24 over a communications port 50. The voice signals are preferably transmitted to the DSP 42 for converting the signals into compressed voice data packets, such as, for example, RTP packets.

The private signaling codes are preferably transmitted to the central processor 44 for processing. The SIP stack 48 within the processor is invoked for encapsulating the received private signaling codes within a SIP message. The signaling codes may be encapsulated, for instance, in the body of a SIP invite message, request message, response message, informational message, instant message, or the like. According to one embodiment of the invention, the processor embeds the actual opcode data received from the telephone 22 or PBX 24 into the SIP message. According to another embodiment of the invention, the processor converts the opcode to an extensible markup language (XML) form or a text-based mnemonic form, and embeds the converted data into the SIP message body. The SIP message is then transmitted via the network interface 46 to a communications port 52 for delivery over the IP network 26.

The network interface 46 may further receive a SIP message with encapsulated private signaling codes for decoding by the processor 44. In this regard, the signaling protocol stack 48 receives the SIP message and examines the body of the message for header data indicating that private signaling codes are embedded therein. Upon identifying such header data, the processor retrieves the embedded private signaling codes and forwards them to the private signaling and voice interface 40 for transmitting to the telephone 22 or PBX 24. If the SIP message body includes mnemonic form data instead of opcode data, the processor interprets/converts the mnemonic form data to opcode data before transmitting the opcode data to the telephone or PBX.

Figure 5:
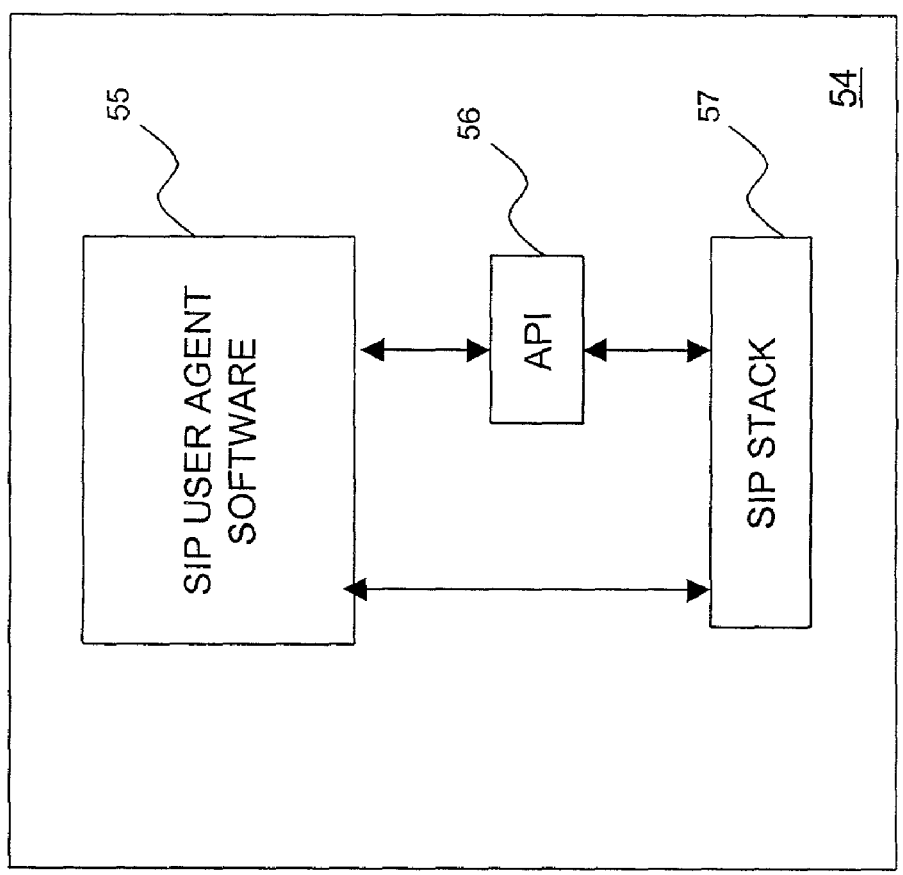
FIG. 5 is a schematic block diagram of an enhanced SIP user agent which has been made aware of private signaling codes according to one embodiment of the invention.

FIG. 5 is a schematic block diagram of a SIP user agent 54 that is aware of private signaling codes according to one embodiment of the invention. The SIP user agent 54 preferably includes a SIP user agent software 55, application program interface (API) 56, and SIP stack 57. The SIP user agent software 55 interacts with the SIP stack 57 for basic call transmit/receive functionality according to conventional mechanisms.

The API 56 is preferably operative between the SIP user agent software 55 and SIP stack 57. The API 56 may be similar to the enhanced IP translator 28, 30 of FIG. 2. According to one embodiment of the invention, the API 56 is a plug-in device configured to read and write private signaling data within SIP message bodies. The plug-in device may be an external hardware device removably coupled to a SIP user agent device. The plug-in device may also be an internal software device downloaded to the SIP user agent. The inclusion of the API 56 in a conventional SIP user agent that is unaware of private signaling codes, and is therefore capable of only enjoying basic PBX functionality, allows the conversion to a SIP user agent that is aware of private signaling codes for accessing a full set of functionality provided by the PBX.

FIGS. 6A–6B are schematic layout diagrams of exemplary SIP messages with embedded private signaling codes according to one embodiment of the invention. The illustrated messages are SIP INVITE messages including a SIP header 60 and a SIP body 62. The SIP header 60 includes standard fields such as a source address 64 and a destination address 66 as set forth in RFC 2543.

The SIP body 62 may include standard SIP body information such as, for example, a session description 68 that adheres to a session description protocol (SDP) set forth in Network Working Group Request for Comments 2327 entitled "SDP: Session Description Protocol," April 1998 (hereinafter referred to as RFC 2327), the content of which is incorporated herein by reference. The session description 68 preferably includes a media address 69 used to receive media information.

According to the embodiment illustrated in FIG. 6A, the SIP body 62 further includes private signaling codes in the form of opcodes 72. The private signaling codes may be preceded by header data 70 indicating that the SIP body data to follow is embedded opcodes, along with an optional vendor identification identifier and a version number of the vendor-specific opcode set.

In the embodiment illustrated in FIG. 6B, the embedded private signaling codes are text-based mnemonic data 74 preceded by header data 76 that may indicate a version of the mnemonic set for proper conversion to opcode data by a receiving enhanced IP translator 28, 30 or SIP user agent 36a aware of private signaling codes.

Figure 7A:
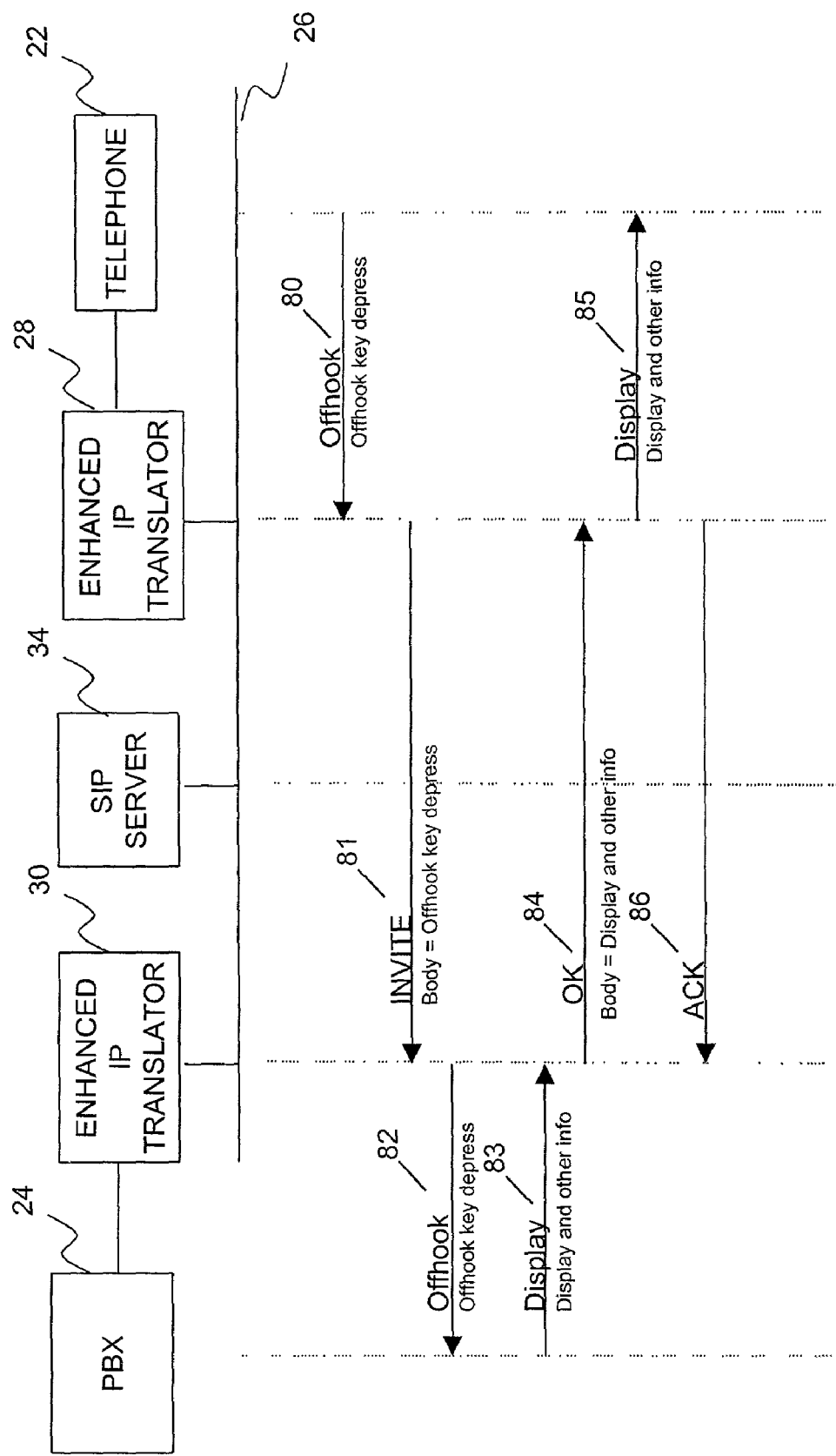
FIG. 7A is a signaling sequence diagram illustrating setup and processing of a call initiated by a telephone according to one embodiment of the invention.

FIG. 7A is a signaling sequence diagram illustrating setup of a call initiated by the telephone 22 according to one embodiment of the invention. In step 80, a user of the telephone 22 causes the telephone to go offhook for initiating the call. In response, the telephone 22 emits a private offhook command. The enhanced IP translator 28 for the telephone 22 (hereinafter referred to as the telephone translator 28) receives the private offhook command and embeds it in a body of a SIP INVITE message. The telephone translator 28 further includes its address as the media address for receiving future SIP messages in the media description also included in the message body. The telephone translator 28 may also include other types of information in the message body, such as, for example, caller authentication information.

In step 81, the telephone translator 28 transmits the SIP INVITE message to the enhanced IP translator 30 for the PBX 24 (hereinafter referred to as the PBX translator 30). According to one embodiment of the invention, the PBX translator 30 verifies whether the caller is an authorized caller by examining the authentication information in the body of the INVITE message. Alternatively, the PBX translator 30 does not necessarily require authentication for initiating a call through the translator.

If the caller is authenticated or no authentication is necessary, the PBX translator 30 retrieves the embedded private offhook command from the INVITE message and forwards it to the PBX 24 in step 82. The PBX determines, based on the received signaling command, that a media exchange is to be initiated and accordingly, transmits a private signaling command, which unmutes the telephone's microphone and headset, to the PBX translator 30 in step 83. The PBX may further transmit private signaling commands for displaying information associated with the call to the telephone display.

The PBX translator creates an OK message in response to the INVITE message received in step 81, and embeds the private signaling commands received from the PBX in the body of the OK message. The PBX translator 30 further includes its media address in the session description as the address for receiving future SIP media. In step 84, the PBX translator 30 transmits the OK message to the telephone translator 28 with encapsulated private signaling data within the message.

The telephone translator 28 receives the OK message and retrieves/un-encapsulates the embedded private signaling commands from the body of the message. The retrieved commands are forwarded to the telephone 22 in step 85. After receiving the OK response from the PBX translator 30, the telephone translator 28 transitions into a media call and displays any information transmitted by the PBX. The telephone translator 28 further responds with an ACK message in step 86.

Although the SIP server 34 is not utilized in the embodiment illustrated in FIG. 7A, a person skilled in the art should recognize that an analogous sequence of events occurs when the SIP messages transit one or more standard SIP servers, such as SIP server 34. The SIP servers may add additional third-party functionality such as opening a firewall, initiating start of billing signal for an IP service provider network, and the like. The exchange of private signaling codes preferably occurs in a manner that is transparent to the SIP servers given that they simply forward the standard SIP messages without examining message body content and add specific services according to their specific functions.

Figure 7B:
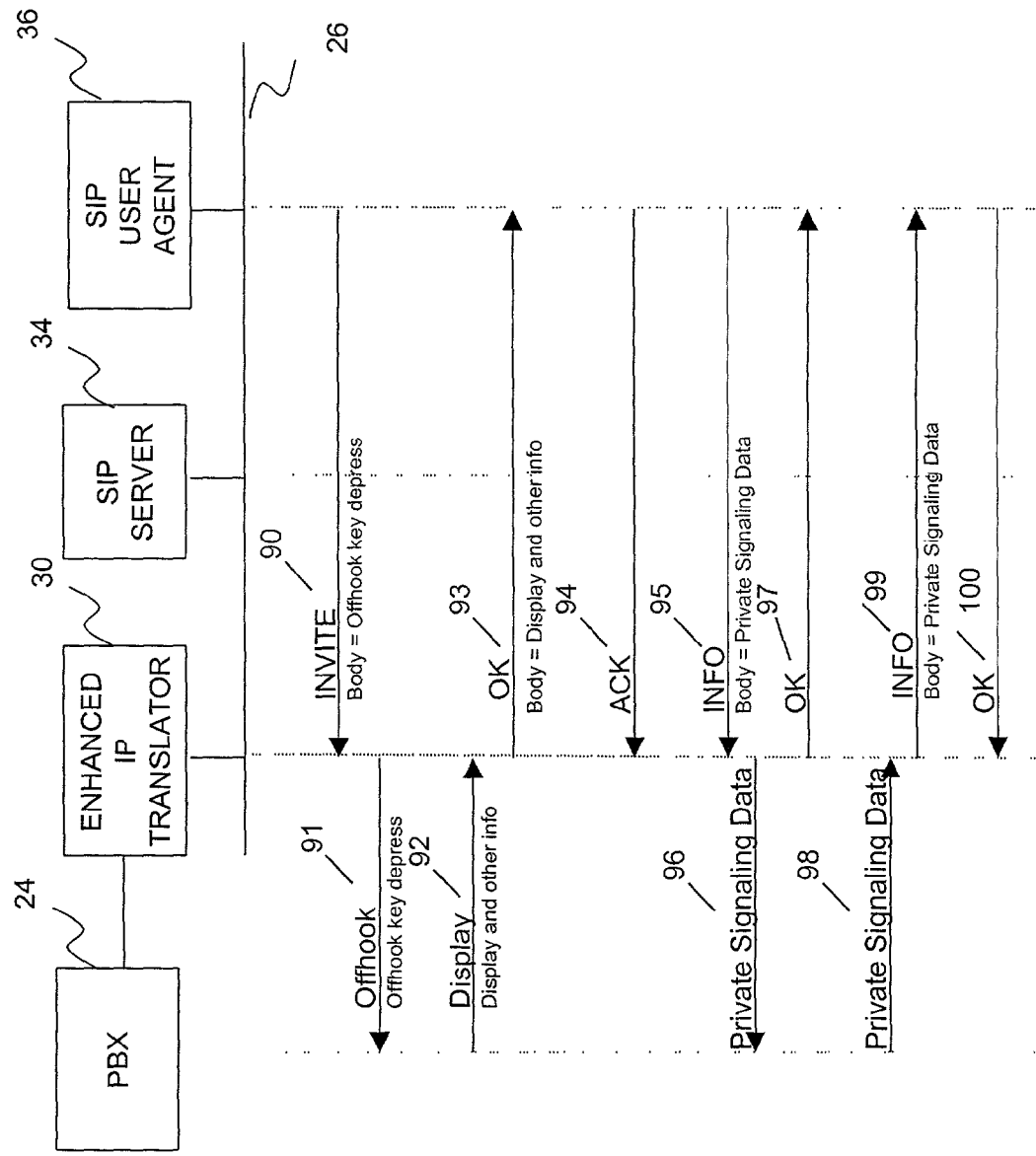
FIG. 7B is a signaling sequence diagram illustrating setup and processing of a call initiated by a SIP user agent aware of private signaling codes according to one embodiment of the invention.

FIG. 7B is a signaling sequence diagram illustrating setup of a call initiated by the SIP user agent 36 according to one embodiment of the invention. For purposes of this illustration, it is assumed that the SIP user agent 36 is aware of the private signaling codes used between the telephone 22 and PBX 24.

In step 90, the SIP user agent 36 initiates a call by transmitting an INVITE message. The INVITE message preferably encapsulates the private signaling codes such as, for example, a private offhook code, issued by the SIP user agent software application through suitable use of the API 56. The INVITE message further includes the SIP user agent's media address in the session description as the address for receiving future SIP media.

The PBX translator 30 receives the INVITE message and retrieves the embedded private offhook command in the INVITE message. The private offhook command is forwarded to the PBX 24 in step 91. The PBX determines, based on the received command, that a media exchange is to be initiated and accordingly, transmits a private signaling command, which unmutes the microphone and headset, to the PBX translator 30 in step 92. The PBX may further transmit private signaling commands for displaying information associated with the call.

The PBX translator 30 creates an OK message in response to the INVITE message received in step 90, and embeds the private signaling commands received from the PBX in the body of the OK message. The PBX translator 30 further includes its media address in the session description as the address for receiving future SIP media. In step 93, the PBX translator 30 transmits the OK message to the SIP user agent 36 with an encapsulated private signaling data within the message.

The SIP user agent 36 receives the OK message and retrieves/un-encapsulates the embedded private signaling commands from the body of the message. The SIP user agent proceeds to display any private signaling information transmitted by the PBX. The SIP user agent 36 further responds with an ACK message in step 94.

During the course of the call, the SIP user agent 36 may emit other private signaling codes for accessing particular PBX functions. Such private signaling codes are preferably encapsulated within SIP INFO messages and transmitted to the PBX translator 30 in step 95. The PBX translator retrieves and transmits the codes to the PBX 24 in step 96, and responds to the SIP user agent with an OK message in step 97.

The PBX 24 may also issue private signaling codes to the PBX translator 30 in step 98. Such private signaling codes are preferably encapsulated in a SIP INFO message and transmitted to the SIP user agent 36 in step 99. The SIP user agent 36 responds to the INFO message with an OK message in step 100.

Figure 8:
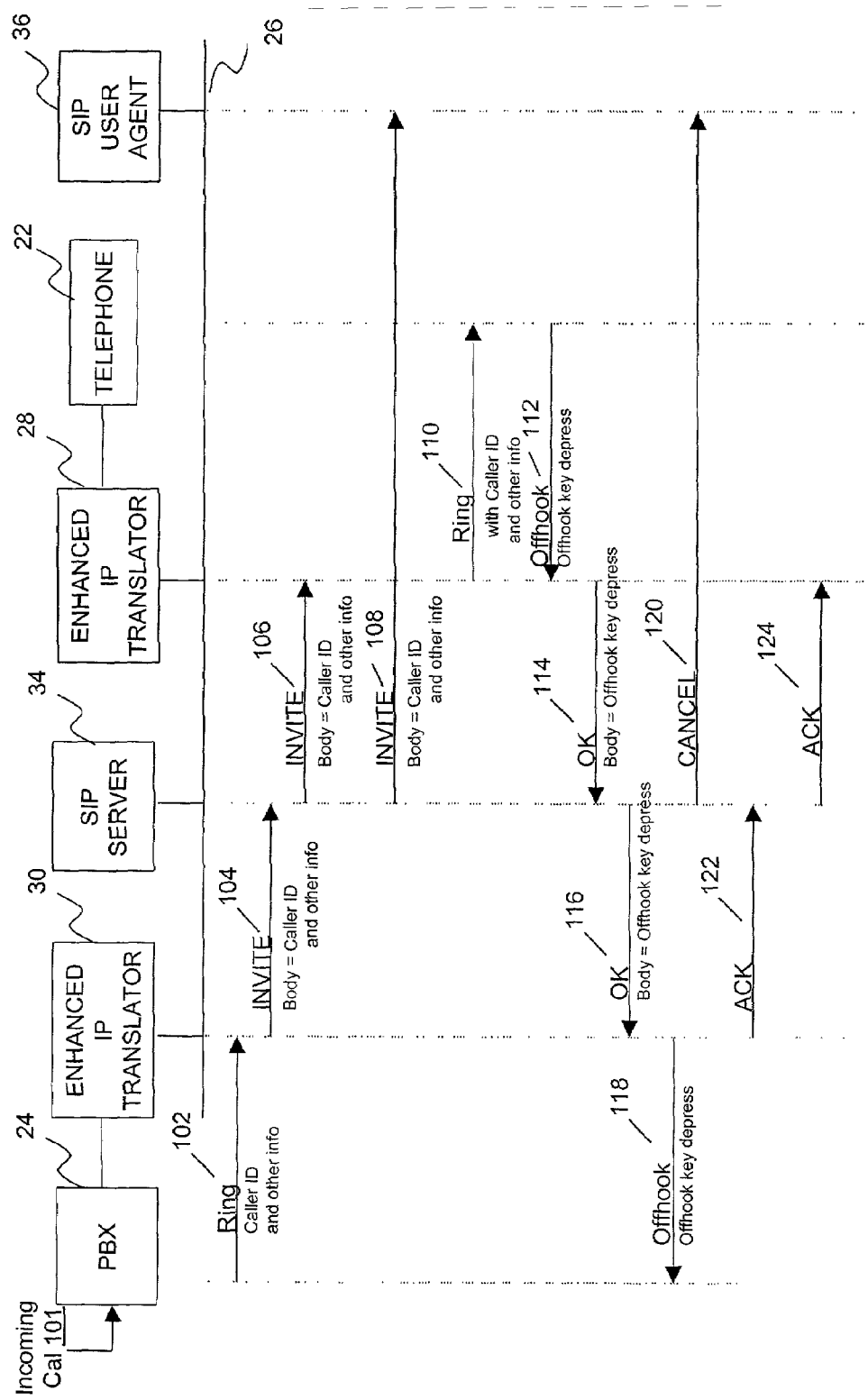
FIG. 8 is a signaling sequence diagram illustrating processing of an incoming call to a PBX according to one embodiment of the invention.

FIG. 8 is a signaling sequence diagram illustrating the processing of an incoming call to the PBX 24 according to one embodiment of the invention. It is assumed for purposes of this illustration that the telephone 22 and SIP user agent 36 are associated with a called extension number and are both registered with the SIP server 34.

In step 101, a call for the called extension arrives at the PBX 24. In step 102, the PBX 24 initiates a private ring command to the called extension with other private signaling information such as, for example, a caller ID, display information, ring type, LED flashing indications, and the like. In this regard, the PBX translator 30 creates a SIP INVITE message that includes the private ring command and other private signaling information in the body of the message. The PBX translator 30 further includes its address in the session description as the media address for receiving future SIP messages from the callee.

In step 104, the PBX translator 30 transmits the SIP INVITE message to the SIP server 34. The SIP server 34 invokes the SIP services 32 to search for registered devices for the called extension, and concludes that both the telephone 22 and SIP user agent 36 are registered. In steps 106 and 108, the SIP server 34 proceeds to forward the INVITE message with the embedded private signaling codes to both the telephone translator 28 and SIP user agent 36.

Upon arrival of the SIP INVITE message at the telephone translator 28, the translator extracts the private ring command and other private signaling codes from the SIP message body and forwards them to the telephone in step 110, causing the telephone to ring with the appropriate type of ring, display the correct display information such as the caller ID or caller's name, and/or flash the appropriate LEDs as indicated by the extracted private signaling codes.

The SIP INVITE message transmitted to the SIP user agent 36 also causes the associated device to indicate an incoming call and alerts the user. If the SIP user agent 36 has been made aware of the private signaling codes, the SIP user agent extracts the embedded private signaling codes to perform the functions and/or displays indicated by the codes. If the SIP user agent 36 is unaware of the private signaling codes, the agent simply disregards the codes embedded in the SIP message and thereby functions as a conventional SIP user agent.

In step 110, the callee responds to the incoming call by causing the telephone 22 to go offhook. The offhook operation causes the telephone 22 to emit a private signaling offhook code. The telephone 22 may also emit other private signaling codes such as, for example, codes indicating whether the offhook command was transmitted by lifting the handset or by depressing a speakerphone key. In step 112, the telephone translator 28 receives the private signaling codes emitted by the telephone 22 and embeds them in a SIP OK message. The telephone translator 28 further includes its address in the session description as the media address for receiving future SIP messages from the caller.

In step 114, the telephone translator 28 transmits the OK message to the SIP server 34 for forwarding to the PBX translator 30 in step 116. The PBX translator 30 retrieves the private signaling data from the OK message and transmits the data to the PBX 24 in step 118. From the received data, the PBX 24 determines that the call has been answered and may further determine how the call was answered, that is, via handset offhook or speakerphone.

Because the call was answered by the telephone 22 and not by the SIP user agent 36, the SIP server 34 cancels the call to the SIP user agent 36 by transmitting a CANCEL SIP message in step 120. Furthermore, the PBX translator 30 issues an ACK message in step 122 which is forwarded to the telephone translator 28 in step 124 in response to the OK message. Voice conversation then ensues in step 126 between the caller through the PBX 24 and the telephone 22.

Figure 9:
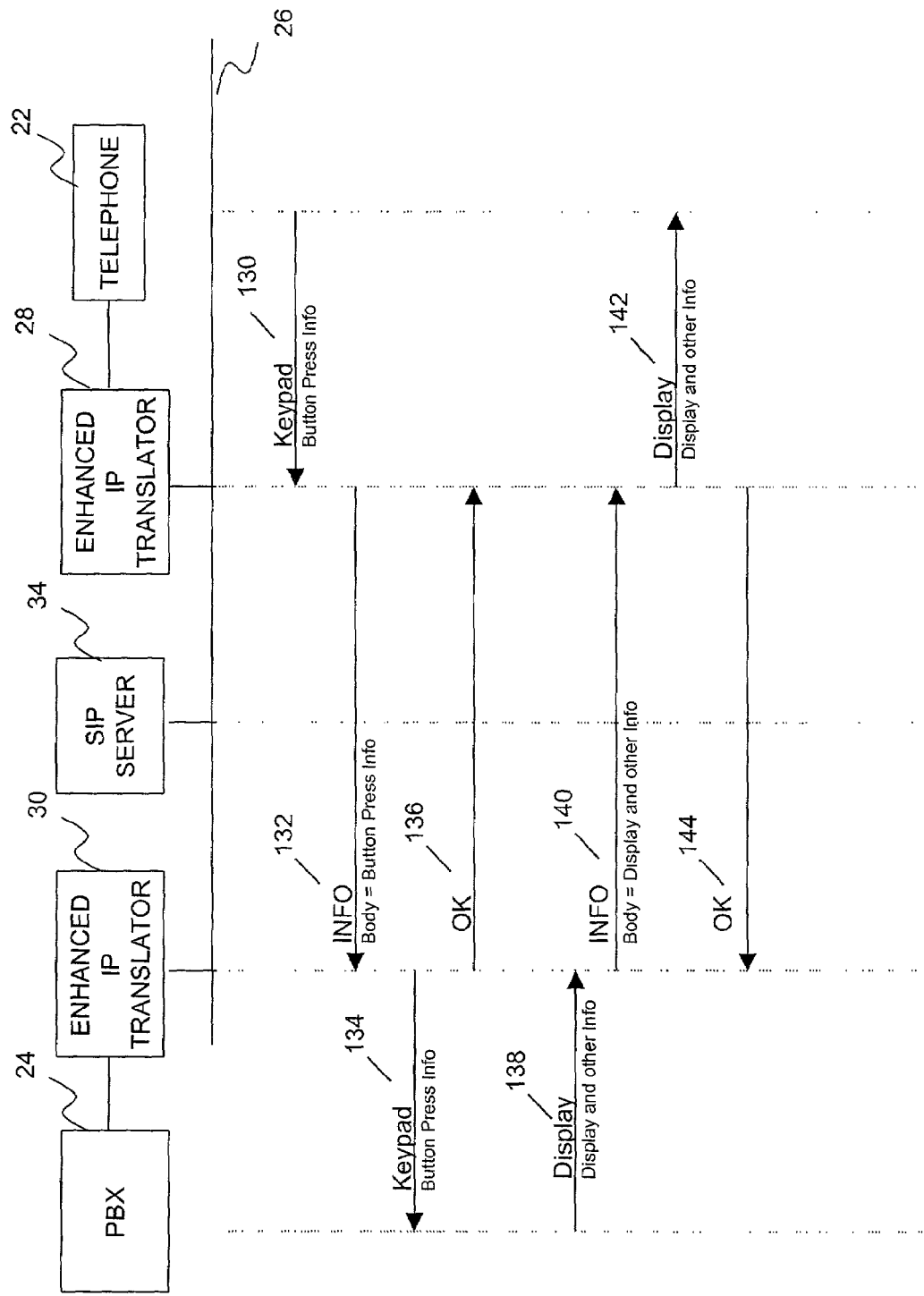
FIG. 9 is a signaling sequence diagram illustrating exchange of private signaling codes between a PBX and telephone while a call is already in progress according to one embodiment of the invention.

FIG. 9 is a signaling sequence diagram illustrating the exchange of private signaling codes between the PBX 24 and telephone 22 mid-call, that is, after a call has been setup, according to one embodiment of the invention. The telephone 22 may emit private signaling codes during the call. For example, the user may wish to transition between voice on the handset and voice on the speakerphone. In step 130, a keypad button is pressed on the telephone 22 causing the telephone to emit an associated private signaling command to the telephone translator 28. The private signaling command from the telephone is encapsulated in the body of a SIP INFO message and transmitted to the PBX translator 30 in step 132. The PBX translator 30 retrieves the encapsulated private signaling command and forwards it to the PBX 24 in step 134. The PBX translator 30 responds with an OK SIP message in step 136. In step 138, the PBX 24 issues a private signaling command during the call, such as, for example, information on elapsed call time. The PBX translator 30 receives the command and encapsulates it in a body of a SIP INFO message. The SIP INFO message is transmitted in step 140 to the telephone translator 28, either directly or via the SIP server 34.

The telephone translator 28 extracts the private signaling codes and forwards these to the telephone 22 in step 142. In step 144, the telephone translator 28 responds back to the PBX translator 30 with a SIP OK message.

A person skilled in the art should recognize that other SIP messages besides INVITE, INFO, and OK messages may be used to transport private signaling codes. Preferably, the PBX and telephone translators 28, 30 encapsulate pending private signaling commands in a SIP request message to be transmitted next in a SIP signaling sequence. For example, if the telephone translator 28 were to transmit a SIP BYE message in response to a user hanging-up the telephone 22, the telephone translator encapsulates a private onhook command in the BYE message. If no SIP messages are pending to the transmitted, private signaling commands may be transmitted in SIP INFO messages, SIP NOTIFY messages, SIP instant messages, or the like.

As discussed above with reference to FIG. 3, multiple devices associated with a particular extension may receive INVITE messages for an incoming call. Any of these devices may go offhook and generate an appropriate private signaling message to the PBX 24 in response to the incoming INVITE message. The PBX translator 30 is preferably aware of all devices associated with a particular extension and is configured to transmit private signaling codes during a call to all associated devices and not only to the device exchanging media. This becomes desirable, for instance, if a new voice mail message arrives during a call. The new voice mail message indication is not only transmitted to the device currently engaged in the call, but also to all associated devices, allowing a user to be alerted of the new voice mail message via display of a message waiting indicator on all of the devices associated with the extension.

Figure 10:
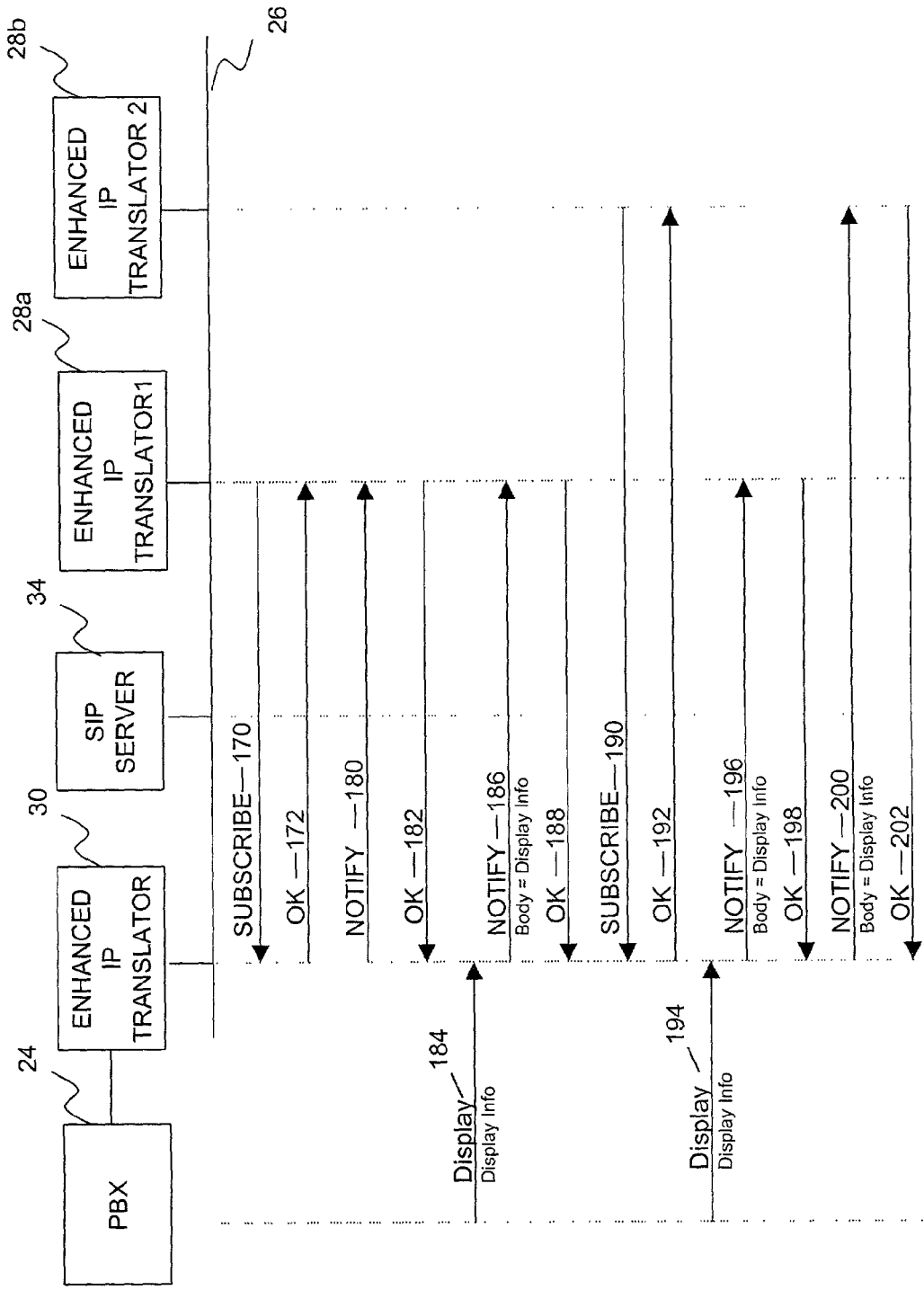
FIG. 10 is a signaling sequence diagram illustrating a subscription and notification mechanism for allowing a PBX to determine which devices will receive out-of-call private signaling information according to one embodiment of the invention.

FIG. 10 is a signaling sequence diagram illustrating a subscription and notification mechanism for allowing the PBX 24 to determine the devices that should receive out-of-call private signaling commands according to one embodiment of the invention. For purposes of this example, it is assumed that telephone translators 28a and 28b are associated with a same extension number.

In step 170, the PBX translator 30 receives a SIP SUBSCRIBE message from a previously unsubscribed telephone translator 28a. In step 172, the PBX translator 30 responds with an OK message and subscribes telephone translator 28a by adding it to its list of subscribed clients for the given extension. Once subscribed, the PBX translator 30 monitors, on its own accord or in response to conventional heartbeat signals provided by the PBX, the viability of telephone translator 28a and its associated telephone. In this regard, the PBX translator 30 transmits, in step 180, a NOTIFY message at a predetermined time. Telephone translator 28a responds with an OK message in step 182 if it is online and all associated functionality is operating normally. If telephone translator 28a fails to respond with an OK message after the receipt of a single or multiple NOTIFY messages, the PBX translator 30 proceeds to de-subscribe the telephone translator, preventing future private signaling codes to be transmitted to the telephone translator until successful re-subscription. Upon re-subscription, the PBX translator 30 transmits updated notifications that the re-subscribed translator may have missed while disabled. This information is preferably made available via conventional state refresh commands from the PBX 24.

Upon issuance of a private signaling command by the PBX 24 in step 184, the PBX translator 30 embeds the command in a SIP message for transmitting to telephone translator. Preferably the command is embedded in a NOTIFY message and transmitted in step 186 if telephone translator 28a is not currently involved in a call with the PBX 24. Alternatively, if telephone translator 28a is involved in the call, the command may be embedded within INFO, OK, and/or INVITE messages. Telephone translator 28a responds to the NOTIFY message with an OK message in step 188, indicating receipt of the NOTIFY message.

In step 190, the PBX translator 30 receives a new SUBSCRIBE message from previously unsubscribed enhanced IP translator 28b, to which the PBX translator responds with an OK message in step 192. The PBX translator then proceeds to add telephone translator 28b to the list of subscribed clients. Issuance of future private signaling commands by the PBX 24 in step 194 causes the PBX translator 30 to transmit the commands to both telephone translators 28a and 28b. For out-of-call notifications, the PBX translator 30 transmits the commands in NOTIFY messages in steps 196, 200, to which the telephone translators 28a, 28b respond with OK messages in steps 198, 202.

Figure 11:
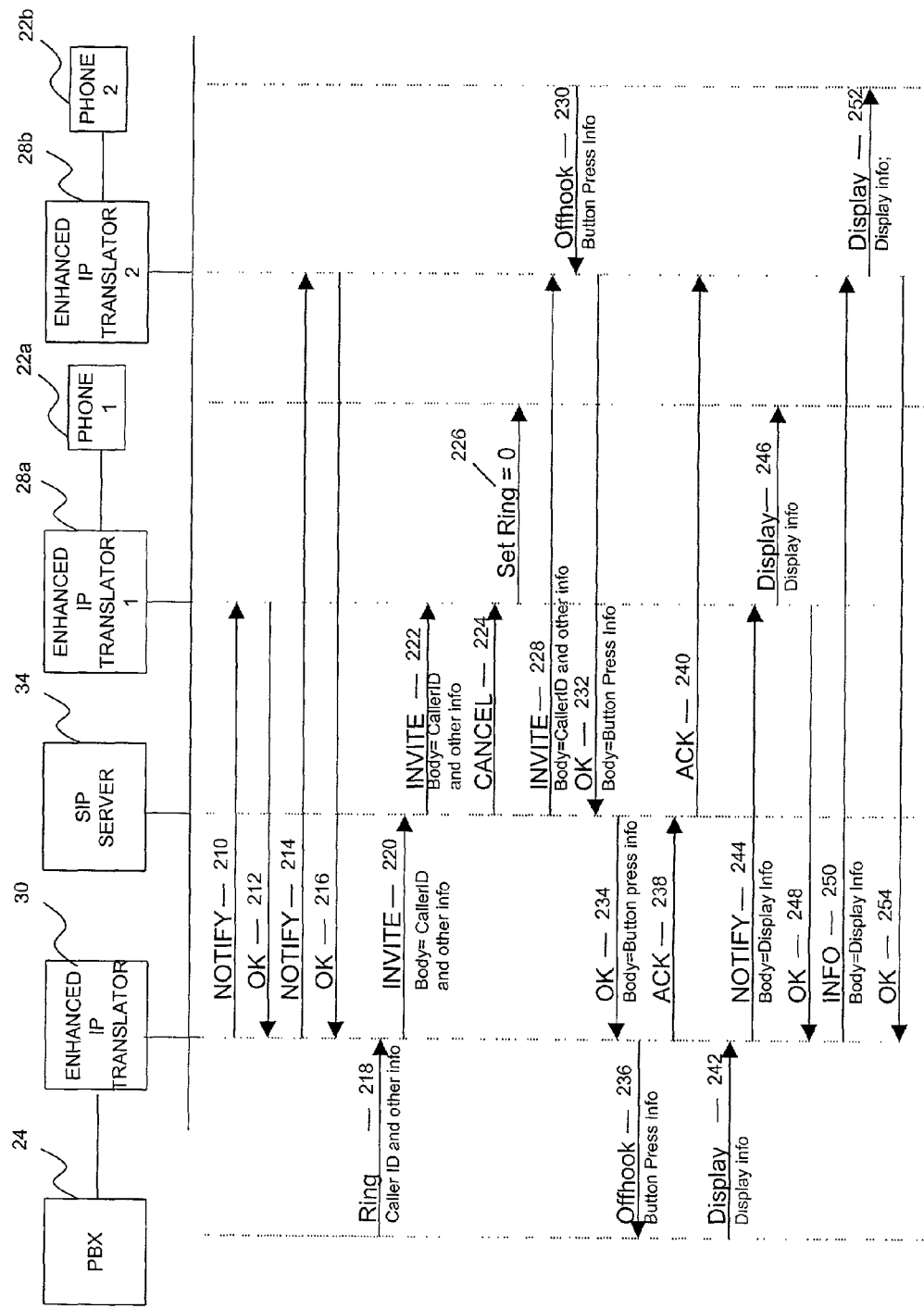
FIG. 11 is a signaling sequence diagram between a PBX translator and telephone translators for transmitting in-call and out-of-call private signaling commands according to one embodiment of the invention.

FIG. 11 is a signaling sequence diagram between the PBX translator 30 and telephone translators 28a, 28b for transmitting in-call and out-of-call private signaling commands according to one embodiment of the invention. In steps 210, and 214, the PBX translator 30 transmits heartbeat NOTIFY messages to telephone translators 28a and 28b for determining their viability. If functioning properly, the telephone translators 28a, 28b respond with OK messages in steps 212 and 216.

An incoming call for a called extension arrives at the PBX 24 and in step 218, the PBX 24 initiates a private ring command to the called extension along with any other private signaling information. The PBX translator 30 creates a SIP INVITE message in response and includes the private ring command and any other private signaling information in the body of the message. The PBX translator 30 further includes its address in the session description as the media address for receiving future SIP messages from the callee.

In step 220, the PBX translator 30 transmits the SIP INVITE message to the SIP server 34. The SIP server 34 invokes the SIP services 32 to search for the registered devices for the called extension, and concludes that telephone translators 28a and 28b have been registered. In steps 222 and 228, the SIP server 34 forwards the INVITE message with the embedded private signaling codes to both telephone translators 28a and 28b.

Upon arrival of the SIP INVITE message, each translator 28a, 28b extracts the private ring command and other private signaling codes from the SIP message body and forwards them to their respective telephones 22a, 22b, causing the telephones to ring and perform any other functions indicated by the embedded private signaling codes.

In the illustrated embodiment, telephone translator 28a fails to answer the incoming call and as a result, the SIP server 34 transmits a CANCEL message in step 224 canceling the INVITE message. Telephone translator 28a receives the CANCEL message and issues a private command to terminate the ringing of the associated telephone 22a in step 226.

The INVITE message to telephone translator 28b causes the user to go offhook and the telephone translator 28b then emits a private offhook command and any other private signaling commands in step 230. Telephone translator 28b embeds the private offhook command and any other private signaling commands from the telephone in an OK message transmitted to the SIP server 34 in step 232.

The SIP server 34 forwards the OK message in step 234 to the PBX translator 30. The PBX translator 30 retrieves the offhook command and any other embedded private commands from the body of the OK message and forwards it to the PBX 24 in step 236. The PBX translator 30 responds to the OK message with an ACK message which is transmitted to the SIP server 34 in step 238 and in turn forwarded to telephone translator 28b in step 240.

During the course of the call between the PBX 24 and telephone 22b, private signaling commands are emitted by the PBX and forwarded to the PBX translator 30 in step 242. For example, the PBX 24 may issue commands for displaying an elapsed call time. The PBX translator 30 receives the private signaling commands and determines the subscribed devices associated with the called extension. In this regard, the PBX translator searches its current subscription list for determining that both telephone translator 28a and 28b are subscribed clients. The PBX translator 30 further determines that the current call is engaged with telephone translator 28b.

Accordingly, the PBX translator 30 transmits the received private signaling commands in a SIP INFO message for telephone translator 28b in step 250, and in a SIP NOTIFY message for telephone translator 28a in step 244. Upon receipt of the SIP messages, each translator retrieves the embedded private signaling commands and forwards these to their respective telephones 22a, 22b. The telephone translators 28a, 28b further respond to the SIP messages with OK messages in steps 248 and 254.

Although this invention has been described in certain specific embodiments, those skilled in the art will have no difficulty devising variations which in no way depart from the scope and spirit of the present invention. It is therefore to be understood that this invention may be practiced otherwise than is specifically described. Thus, the present embodiments of the invention should be considered in all respects as illustrative and not restrictive, the scope of the invention to be indicated by the appended claims and their equivalents rather than the foregoing description.

What is claimed is:

1. A telephony communications network comprising:
    a telephony unit generating a private telephony signaling code, the telephony unit is a Session Initiation Protocol (SIP) user agent;
    a translator coupled to the telephony unit, the translator encapsulating the private telephony signaling code in a application layer control protocol message, the application layer control protocol is a SIP; and
    a communications interface coupled to the translator for transmitting the message over a communications network.

2. The network of claim 1 further comprising:
    one or more second telephony units; and
    one or more second translators coupled to the one or more second telephony units, characterized in that the one or more second translators receive the message transmitted over the communications network and decapsulate the private telephony signaling code in the message, further characterized in that the one or more second translators forward the telephony signaling code to the one or more second telephony units for performing a function in response to the private telephony signaling code.

3. The network of claim 2 further comprising a server for routing the message to the one or more second translators.

4. The network of claim 3, wherein the server provides a third party service for the telephony unit.

5. The network of claim 2, wherein the translator determines the one or more second translators viable for receiving the message and transmitting the message to the viable translators.

6. The network of claim 2, wherein the one or more second translators subscribe with the translator for receiving the message.

7. The network of claim 2, wherein the one or more second translators receive the message in an out-of-call data transfer.

8. The network of claim 1, wherein the telephony unit is a digital telephone.

9. The network of claim 1, wherein the telephony unit is a private branch exchange unit.

10. A telephony communications network supporting a session initiation protocol (SIP) session, the network comprising:
    a SIP client transmitting and receiving SIP messages during the SIP session; and
    a translator coupled to the SIP client, the translator being an application programming interface, the translator configured to encapsulate and decapsulate private telephony signaling codes in and from the SIP messages for allowing the SIP client access to PBX functionality associated with the private telephony signaling codes.

11. In a telephony communications network comprising a telephony unit and a translator coupled to the telephony unit, the translator comprising:
    a signaling interface receiving a private telephony signaling code;
    a processor coupled to the signaling interface, the processor configured to encapsulate the private telephony signaling code in a session layer control protocol message, the session layer control protocol being a Session Initiation Protocol (SIP);
    the telephony unit being a SIP user agent; and
    a network interface coupled to the processor for transmitting the message over a communications network.

12. The translator of claim 11, wherein the processor is further configured to decapsulate a second private telephony signaling code in a second session layer control protocol message received by the network interface for forwarding to the telephony unit over the signaling interface.

13. The translator of claim 11, wherein the telephony unit is a digital telephone.

14. The translator of claim 11, wherein the telephony unit is a private branch exchange unit.

* * * * *